United States Patent
Zysman et al.

(10) Patent No.: US 11,549,434 B2
(45) Date of Patent: *Jan. 10, 2023

(54) ENGINE BLEED AIR DUCTING INTO HEAT EXCHANGER

(71) Applicant: Raytheon Technologies Corporation, Farmington, CT (US)

(72) Inventors: Steven H. Zysman, Amston, CT (US); Karl D. Blume, Hebron, CT (US); James H. Anderson, Vernon, CT (US); Holly Teufel, Salt Lake City, UT (US); Jesse W. Clauson, Agawam, MA (US); Xiaojun Campbell, East Hampton, CT (US); William O. Taylor, Bloomfield, CT (US); Graham A. Kaiser, Manchester, CT (US); Karl Milenkovic, West Palm Beach, FL (US); Michael C. Rhodes, Vernon, CT (US); Tsering Dolma, Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,951

(22) Filed: Jul. 16, 2021

(65) Prior Publication Data

US 2021/0363923 A1    Nov. 25, 2021

Related U.S. Application Data

(63) Continuation of application No. 16/269,151, filed on Feb. 6, 2019, now Pat. No. 11,078,837.

(51) Int. Cl.
*F02C 6/08* (2006.01)
*F02C 7/14* (2006.01)
(Continued)

(52) U.S. Cl.
CPC ............... *F02C 6/08* (2013.01); *F02C 7/06* (2013.01); *F02C 7/14* (2013.01); *F02C 7/18* (2013.01);
(Continued)

(58) Field of Classification Search
CPC ...... F02C 7/12; F02C 7/14; F02C 9/18; F02C 6/08; F02K 3/04–065; F02K 3/115; F05D 2260/213
See application file for complete search history.

(56) References Cited

U.S. PATENT DOCUMENTS 4,254,618 A    3/1981    Elovic
4,773,212 A    9/1988    Griffin et al.
(Continued)

OTHER PUBLICATIONS

Partial European Search Report for EP Application No. 20155717.0 dated Oct. 12, 2020.
(Continued)

*Primary Examiner* — Alain Chau
(74) *Attorney, Agent, or Firm* — Carlson, Gaskey & Olds, P.C.

(57) ABSTRACT

A gas turbine engine includes a compressor section, a combustor, and a turbine section. A bleed tap taps air from the compressor section through a bleed valve. The bleed valve is selectively opened by a control to dump air from the compressor section to a dump outlet. A heat exchanger duct includes a duct air inlet to cool a fluid in a heat exchanger and a duct air outlet. The dump outlet is within the heat exchanger duct.

20 Claims, 4 Drawing Sheets

(51) Int. Cl.
*F02C 9/18* (2006.01)
*F02K 3/115* (2006.01)
*F02C 7/18* (2006.01)
*F02C 7/06* (2006.01)
*F02C 7/36* (2006.01)

(52) U.S. Cl.
CPC .................. *F02C 7/36* (2013.01); *F02C 9/18* (2013.01); *F02K 3/115* (2013.01); *F05D 2260/213* (2013.01); *F05D 2260/232* (2013.01); *F05D 2260/40311* (2013.01); *F05D 2260/606* (2013.01); *F05D 2260/98* (2013.01); *F05D 2270/303* (2013.01)

(56) References Cited

U.S. PATENT DOCUMENTS

| | | | |
|---|---|---|---|
| 5,269,135 A | 12/1993 | Vermejan et al. | |
| 6,058,696 A * | 5/2000 | Nikkanen | F02C 7/04 60/262 |
| 6,106,229 A * | 8/2000 | Nikkanen | F02C 7/14 415/176 |
| 6,565,313 B2 * | 5/2003 | Nikkanen | F01D 9/065 415/208.1 |
| 7,926,261 B2 | 4/2011 | Porte | |
| 8,235,170 B1 | 8/2012 | Ertz et al. | |
| 8,397,487 B2 * | 3/2013 | Sennoun | F02C 6/08 60/785 |
| 8,784,047 B2 * | 7/2014 | Elder | F04D 29/584 415/178 |
| 9,200,570 B2 | 12/2015 | Alecu | |
| 9,624,831 B2 | 4/2017 | Brousseau et al. | |
| 9,714,610 B2 | 7/2017 | Snape et al. | |
| 9,932,905 B2 * | 4/2018 | Suciu | F02C 6/08 |
| 10,036,329 B2 | 7/2018 | Suciu | |
| 10,494,949 B2 | 12/2019 | Rambo et al. | |
| 11,078,837 B2 * | 8/2021 | Zysman | F02C 7/06 |
| 2002/0139120 A1 | 10/2002 | Sheoran et al. | |
| 2003/0068223 A1 * | 4/2003 | Nikkanen | F01D 9/065 415/144 |
| 2008/0230651 A1 | 9/2008 | Porte | |
| 2011/0265490 A1 | 11/2011 | Klasing et al. | |
| 2012/0114468 A1 * | 5/2012 | Elder | F02C 7/14 415/178 |
| 2012/0216545 A1 * | 8/2012 | Sennoun | F02K 3/115 60/785 |
| 2013/0098059 A1 * | 4/2013 | Suciu | F01D 15/08 60/783 |
| 2014/0000279 A1 | 1/2014 | Brousseau et al. | |
| 2014/0096534 A1 | 4/2014 | Snape et al. | |
| 2015/0247462 A1 | 9/2015 | Suciu | |
| 2016/0024968 A1 | 1/2016 | Stearns et al. | |
| 2017/0184030 A1 | 6/2017 | Brousseau et al. | |
| 2017/0335769 A1 | 11/2017 | Boujida et al. | |
| 2018/0038243 A1 | 2/2018 | Rambo et al. | |
| 2019/0072035 A1 | 3/2019 | Peace et al. | |
| 2019/0323433 A1 | 10/2019 | Bewick et al. | |
| 2020/0063660 A1 * | 2/2020 | Mackin | F02K 3/06 |
| 2020/0088100 A1 * | 3/2020 | Ingley | F02C 3/13 |

OTHER PUBLICATIONS

European Search Report for EP Application No. 20155717.0 dated Feb. 18, 2021.

* cited by examiner

ENGINE BLEED AIR DUCTING INTO HEAT EXCHANGER

CROSS-REFERENCE TO RELATED APPLICATIONS

This application is a continuation of U.S. patent application Ser. No. 16/269,151 filed on Feb. 6, 2019, now U.S. Pat. No. 11,078,837 granted on Aug. 3, 2021.

BACKGROUND

This application relates to ducting engine bleed air.

Gas turbine engines are known and typically include a fan delivering air into a bypass duct as propulsion air. The fan also delivers air into a compressor where it is compressed to high pressures. This high pressure air is then delivered into a combustor where it is mixed with fuel and ignited. Products of this combustion pass downstream over turbine rotors, driving them to rotate.

One system that is typically included in gas turbine engines is a bleed valve to assist the compressor in maintaining stability at certain conditions. As an example, at low power conditions, such as idle, to maintain stability, it is known to bleed a relatively high percentage of the compressed air to a "dump."

Given that there may be high volumes of bleed air, this dump might be at a location which can accommodate relatively high volumes. As an example, the air might be dumped directly into the bypass duct. Other locations might be a turbine exhaust case or a core engine compartment.

Recently, gas turbine engines are operating at higher pressures and intense temperatures in the compressor sections. Thus, the dumped air is moving toward being higher pressure and temperature. Withstanding these pressures and temperatures is a challenge in an element such as a bypass duct, which is not designed to see high temperature.

SUMMARY

In a featured embodiment, a gas turbine engine includes a compressor section, a combustor, and a turbine section. A bleed tap taps air from the compressor section through a bleed valve. The bleed valve is selectively opened by a control to dump air from the compressor section to a dump outlet. A heat exchanger duct includes a duct air inlet to cool a fluid in a heat exchanger and a duct air outlet. The dump outlet is within the heat exchanger duct.

In another embodiment according to the previous embodiment, a fan is positioned to selectively deliver air to the compressor, and also to deliver air into a bypass duct. The duct air inlet takes air from the bypass duct, and the duct air outlet delivers air mixed from the duct air inlet and from the dump outlet back into the bypass duct.

In another embodiment according to any of the previous embodiments, the dump outlet is downstream of a downstream end of the heat exchanger.

In another embodiment according to any of the previous embodiments, the compressor includes a low pressure compressor and a high pressure compressor and the bleed air tap is from the high pressure compressor.

In another embodiment according to any of the previous embodiments, the control is programmed to open the bleed air valve when the gas turbine engine is operating at at least one of an idle condition, a deceleration and an acceleration.

In another embodiment according to any of the previous embodiments, the heat exchanger cools an oil associated with the gas turbine engine.

In another embodiment according to any of the previous embodiments, the turbine drives a gearbox and the oil is associated with the gearbox.

In another embodiment according to any of the previous embodiments, the dump outlet directs air in a direction which is radially outward relative to a rotational axis of the engine.

In another embodiment according to any of the previous embodiments, the heat exchanger duct has a downstream end provided with structure to withstand relatively high temperatures.

In another embodiment according to any of the previous embodiments, the dump outlet is downstream of a downstream end of the heat exchanger.

In another embodiment according to any of the previous embodiments, the compressor includes a low pressure compressor and a high pressure compressor and the bleed air tap is from the high pressure compressor.

In another embodiment according to any of the previous embodiments, the heat exchanger cools an oil associated with the gas turbine engine.

In another embodiment according to any of the previous embodiments, the compressor includes a low pressure compressor and a high pressure compressor and the bleed air tap is from the high pressure compressor.

In another embodiment according to any of the previous embodiments, the control is programmed to open the bleed air valve when the gas turbine engine is operating at at least one of an idle condition, a deceleration and an acceleration.

In another embodiment according to any of the previous embodiments, the heat exchanger cools an oil associated with the gas turbine engine.

In another embodiment according to any of the previous embodiments, the dump outlet includes a plurality of orifices spaced across a flow area of an interior of the heat exchanger duct.

In another embodiment according to any of the previous embodiments, the dump outlet includes an elongated slot spaced across a flow area of an interior of the heat exchanger duct.

In another embodiment according to any of the previous embodiments, the dump outlet is at a radially outer position within the heat exchanger duct.

In another featured embodiment, a gas turbine engine includes a compressor section, a combustor, and a turbine section. There is a bleed means for selectively tapping air from the compressor section to a dump outlet. A heat exchanger duct includes a duct air inlet to pass air over a heat exchanger to cool a fluid in the heat exchanger and a duct air outlet. The dump outlet is within the heat exchanger duct.

In another embodiment according to the previous embodiment, the bleed means includes a tap to the compressor, a valve and a control for the valve.

These and other features may be best understood from the following drawings and specification.

DETAILED DESCRIPTION

Figure 1:
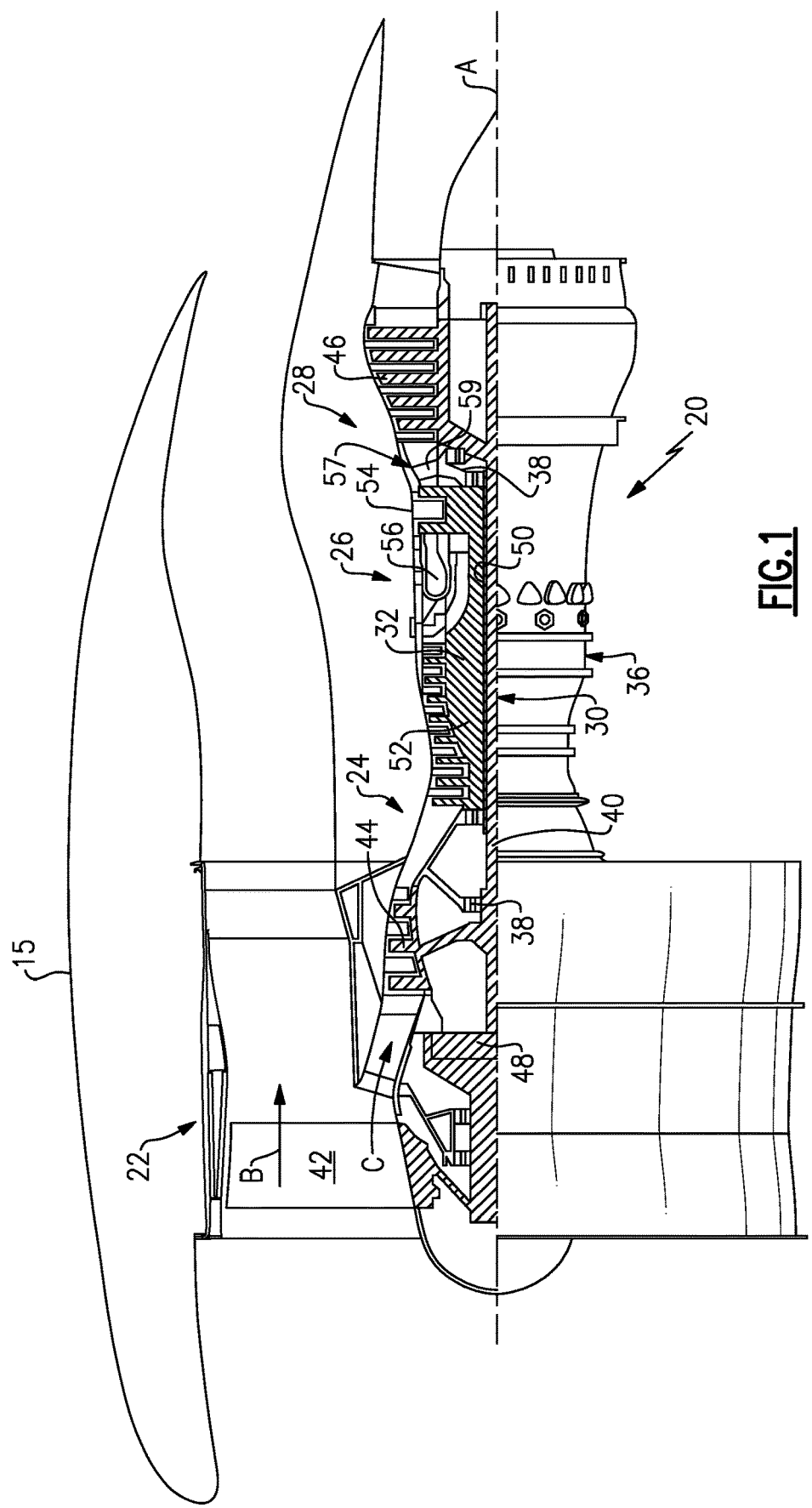
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct 102 defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm per hour of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7 ° R)]^{0.5}$. The "Low corrected fan tip speed" as disclosed herein according to one non-limiting embodiment is less than about 1150 ft/second (350.5 meters/second).

Figure 2:
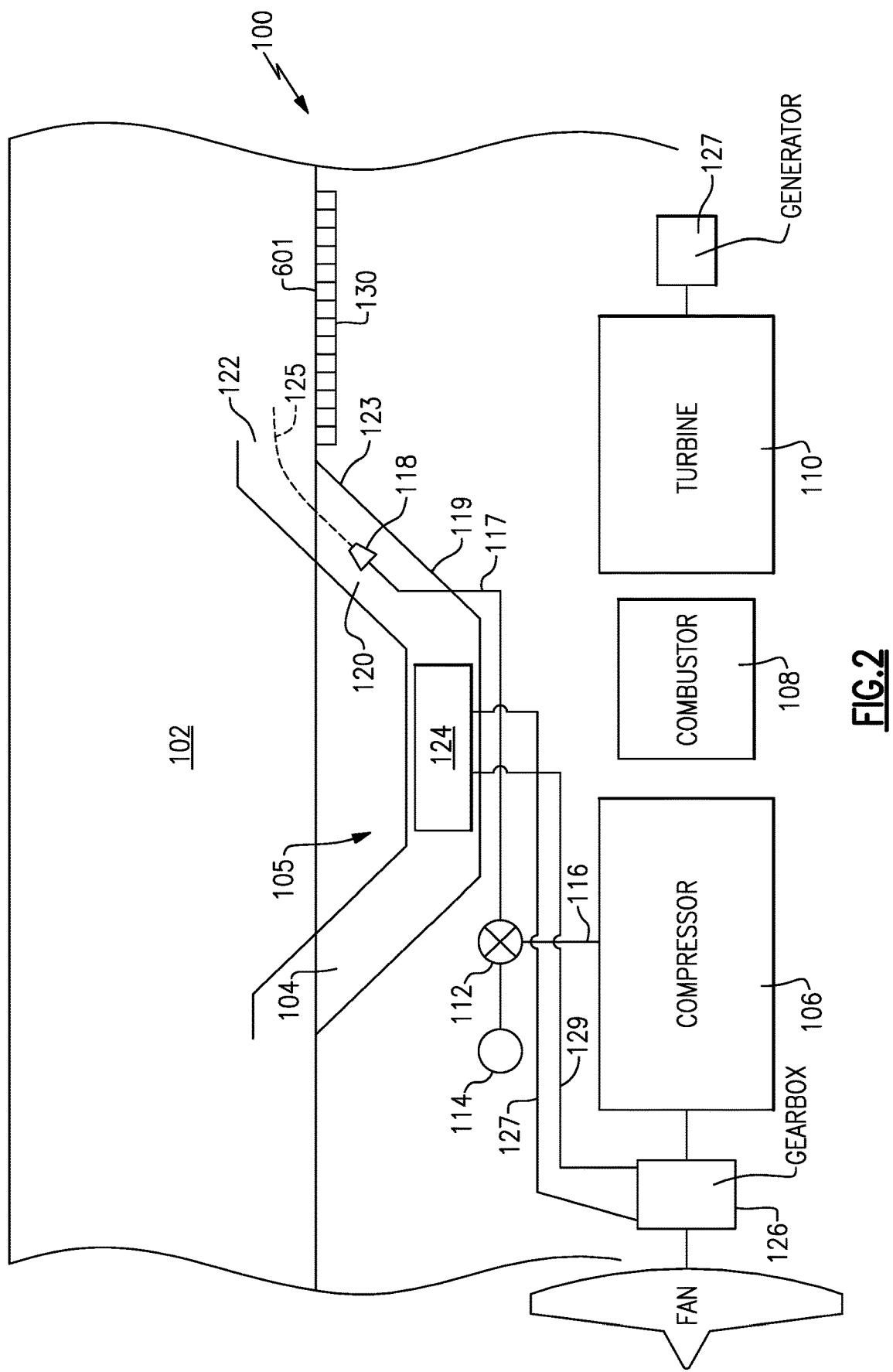
FIG. 2 schematically shows an inventive compressor bleed valve system.

FIG. 2 shows a compressor bleed valve system 100. A bypass duct 102 is shown which may be similar to that in the engine of FIG. 1. An upstream end 104 of an air oil cooler 105 takes in air from the bypass duct 102.

A main compressor section 106 is illustrated upstream of a combustor 108 and a turbine section 110.

A bleed valve 112 is shown with a control 114 for controlling a tap 116 from the main compressor section 106 and for tapping air to a line 117 leading to a dump. The main compressor section 106 includes a low pressure compressor and a high pressure compressor such as in the engine 20 of FIG. 1. Tap 116 communicates with the high pressure compressor in one embodiment. As is known, the control 114 may be programmed to open the valve 112 to dump air under certain conditions to maintain stability of the compressor section 106. As an example, when the gas turbine associated with the bleed air valve system 100 is at an idle condition, or near an idle condition, the valve 112 will be open. As another example, when the gas turbine is commanded to accelerate at low power, or decelerate at high power, the valve 112 will be open. At other conditions, the valve 112 may be moved to be closed. Broadly, it could be said the valve 112 is opened at certain conditions but closed at others.

The control 114 may be a standalone control programmed to control the valve 112 utilizing techniques known to a worker of skill in this art, or alternatively, could be incorporated into a full authority digital electronic controller (FADEC) for the entire engine. In one embodiment it is the FADEC and is programmed to control the valve based upon any number of operational conditions such as ambient temperature, altitude, engine speeds, the status of other bleeds, etc. In general such controls are known.

The air leaves the line 117 at an outlet 118 into a flow 120. Flow 120 communicates with the inlet 104, and communicates through to an outlet 122, wherein the combined flow from the inlet 104 and the dump outlet 118 reenter the bypass 102.

As shown, a duct 119 for the air oil cooler receives both flows from the inlet 104 and the dump outlet 118. A downstream end 123 of the duct 119 is illustrated and the air downstream of the dump outlet 118 will be at this end, which is downstream of the heat exchanger 124. Discharge air from dump outlet 118 will mix with cooler flow 120 while following trajectory 125

Heat exchanger 124 may be an air oil cooler and is shown receiving oil from a component on the gas turbine engine such as a gearbox 126. The oil to be cooled may also come from a generator 127. Air from the bypass duct 102 passes into the inlet 104 to cool the oil in the heat exchanger 124. The gearbox 126 communicates oil with heat exchanger 124 through a supply line 127 and a return line 129.

It is known that the duct 119 and, in particular, its downstream locations 123 are designed to withstand very high temperatures. Thus, dumping the bleed air from the dump outlet 118 into the duct 119 at the location 123, where it has been designed to withstand high temperatures, ensures that the bleed air is better accommodated than in the prior art which dumped the bleed air directly into the bypass duct. By careful design, outlet 118 can be oriented to keep the mixing flow trajectory 125 away from temperature sensitive region 130 of bypass duct 102. While an air oil cooler is illustrated, other heat exchangers may benefit from this disclosure. In addition, other locations, which are designed to withstand temperatures higher than that typically seen in a bypass duct, may benefit from this disclosure and which could then communicate the bleed air into the bypass duct.

Figure 3:
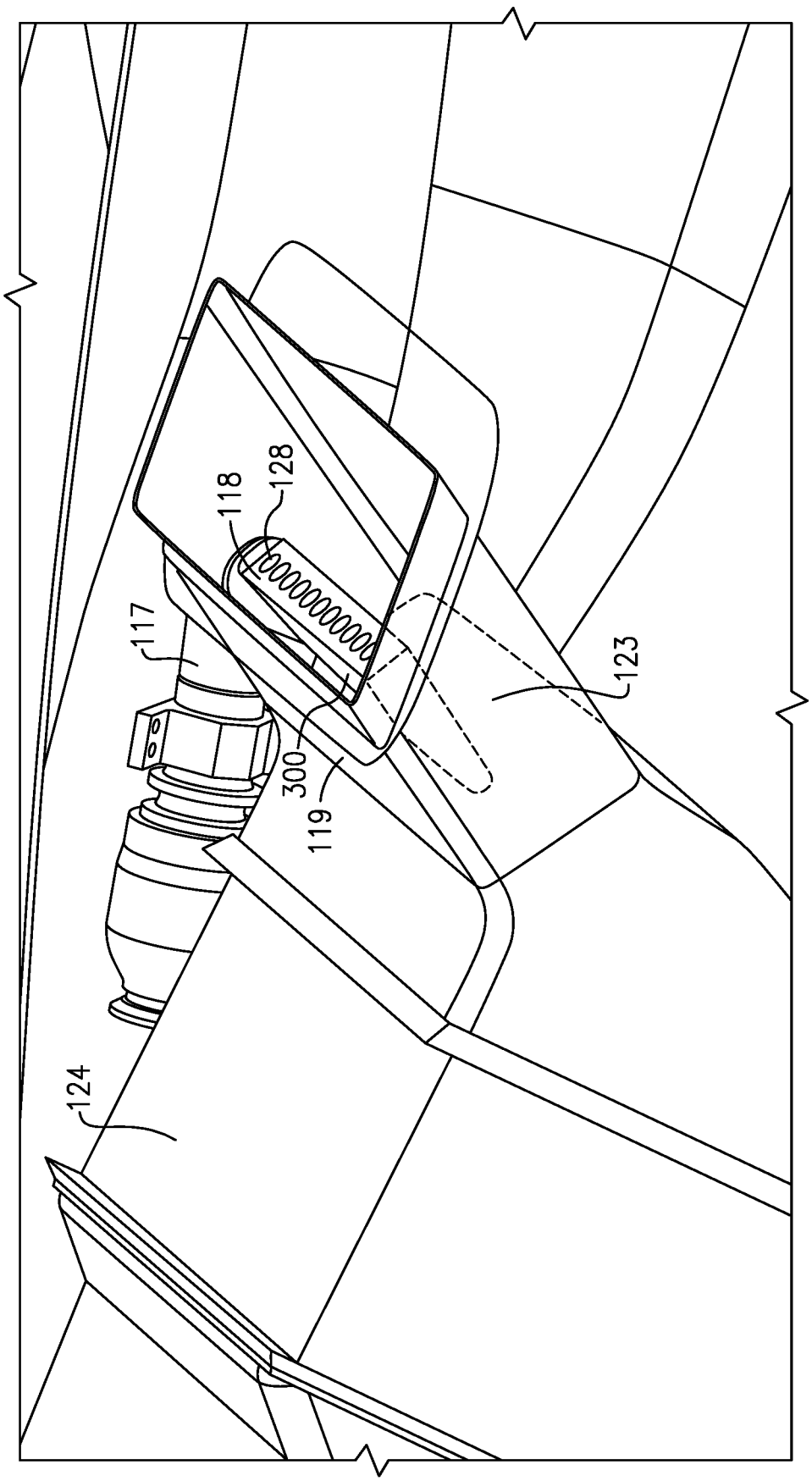
FIG. 3 shows a detail.

FIG. 3 shows a detail, wherein the line 117 communicates with the dump outlet 118. As can be seen, the dump outlet 118 has a portion extending across the duct 119 at the downstream section 123, downstream of the heat exchanger 124. As can be seen, there are a plurality of outlet orifices 128 in the dump outlet 118. As can be seen, dump outlet 118 includes a manifold body 300 leading to the outlet orifices 128. The manifold 300 sits within the duct 119.

Figure 4:
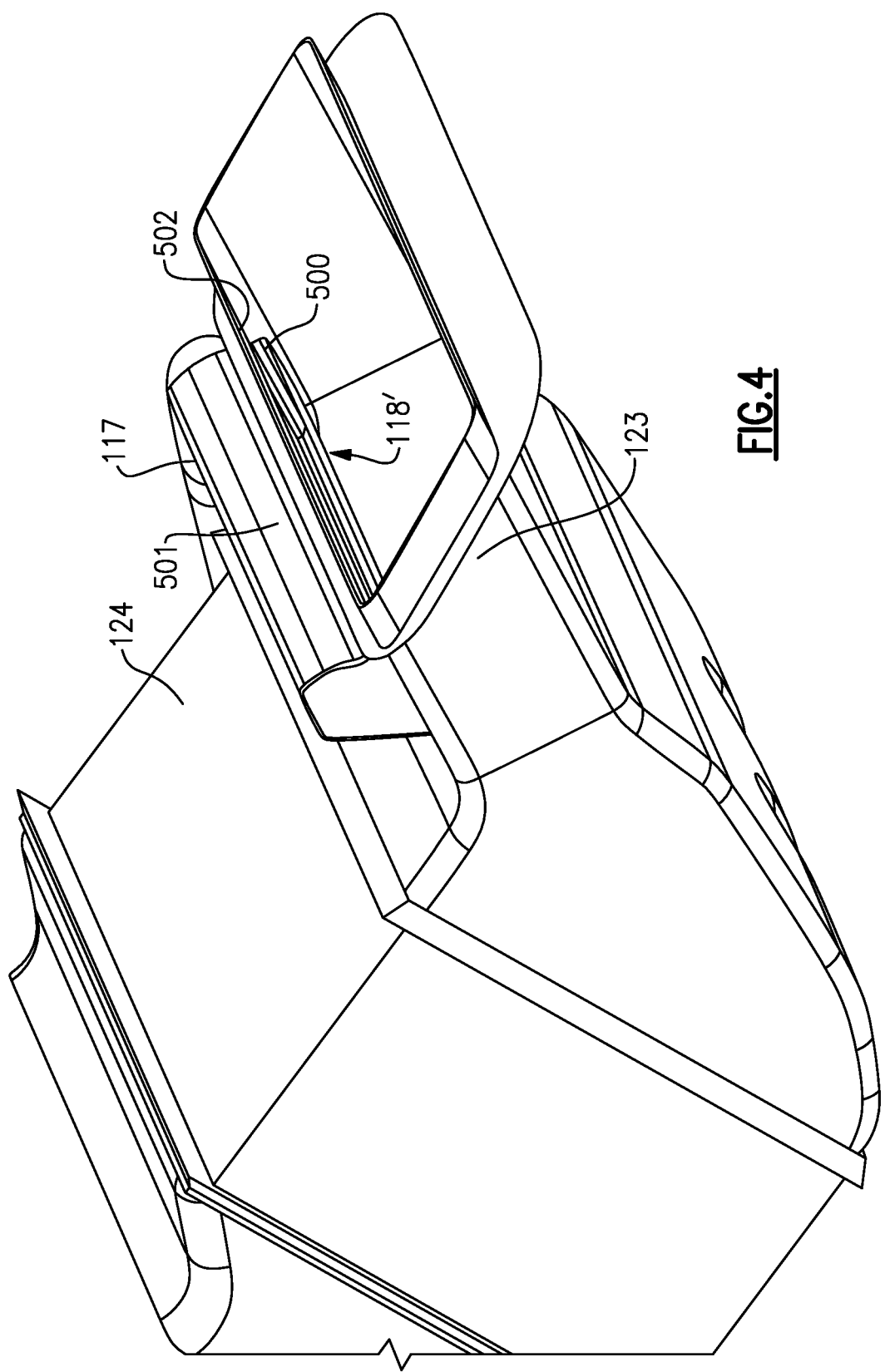
FIG. 4 shows another embodiment.

As shown in FIG. 4 shows an alternative dump outlet 118' wherein a slot 500 replaces the several orifices 128. As can be seen, line 117 now leads to a manifold 501 which sits radially outward of a radially outer wall 502 of the downstream section 123 of the duct. The actual dump outlet 118' sits just inward of the outer wall 502 and has a slot 500. It should be understood that the slot 500 could be utilized in the location of FIG. 3, and the plurality of orifices from FIG. 3 could be in the location of FIG. 4.

By spreading the air across the several orifices 128 or the slot 500, the hot air from the outlet 118 will mix with the air downstream of the heat exchanger 124, which may be hot, but will not be as hot as the air exiting the orifices 128 or slot 500. The several orifices 128 or slot 500 spread the dumped air across a flow area of the duct. Downstream of the duct 119 the hottest portion of the dumped air is directed away from temperature sensitive region 130 of the bypass duct 102.

As can be appreciated, the dump outlet 118 (or 118') directs the dumped air in a direction with a component that is radially outward of an inner wall of the duct such that the hottest air avoids the temperature sensitive region 130 by being directed radially outwardly of an inner wall 601 of the bypass duct 102.

A gas turbine engine according to this disclosure has a compressor section, a combustor, and a turbine section. A bleed tap taps air from the compressor section through a bleed valve. The bleed valve is selectively opened by a control to dump air from the compressor section to a dump outlet. A heat exchanger includes an air inlet to pass air through the heat exchanger to cool a fluid in the heat exchanger. A heat exchanger outlet in a heat exchanger duct connects the heat exchanger inlet and the heat exchanger outlet, and receives the heat exchanger. The dump outlet is within the heat exchanger duct. The heat exchanger duct is provided with structure to withstand relatively high temperatures. As an example, the heat exchanger duct may have a temperature limit of >1000° F., wherein the bypass duct might have a limit of <300° F.

A gas turbine engine according to this disclosure could be said to have a compressor section, a combustor, and a turbine section. There is a bleed means for selectively tapping air from the compressor section to a dump outlet. A heat exchanger duct includes a duct air inlet to pass air through a heat exchanger to cool a fluid in the heat exchanger and a duct air outlet. The dump outlet is within the heat exchanger duct.

In one example, as much as 4% of the air flow entering the compressor 106 may pass through the bleed valve 112. The air can be on the level of about 1200° F. and 200 PSIA.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a compressor section, a combustor, and a turbine section;
a bleed tap for tapping air from said compressor section through a bleed valve, the bleed valve selectively opened by a control to dump air from the compressor section to a dump outlet, said control for said bleed valve being operable to open said bleed valve under certain conditions to maintain stability of said compressor section;
a heat exchanger duct including a duct air inlet to cool a fluid in a heat exchanger and a duct air outlet, and said dump outlet being within said heat exchanger duct;
wherein a fan is positioned to selectively deliver air to said compressor, and also to deliver air into a bypass duct, and said duct air inlet takes air from said bypass duct, and said duct air outlet delivers air mixed from said duct air inlet and from said dump outlet back into said bypass duct;
wherein said dump outlet is downstream of a downstream end of said heat exchanger;
wherein said dump outlet is at a radially outer position within said heat exchanger duct;
wherein said dump outlet directs air in a direction having a component which is radially outward relative to a rotational axis of the gas turbine engine, and there being an inner wall of said bypass duct, such that said dump outlet directs air in said direction to be radially outward, and away from said inner wall of said bypass duct; and
wherein said downstream end of said heat exchanger duct is designed to have a temperature limit of greater than 1000° F., and said inner wall of said bypass duct has a temperature limit of less than 300° F. at an area immediately downstream of said duct air outlet of said heat exchanger duct.

2. The gas turbine engine as set forth in claim 1, wherein said compressor includes a low pressure compressor and a high pressure compressor and said bleed air tap is from said high pressure compressor.

3. The gas turbine engine as set forth in claim 2, wherein said control is programmed to open said bleed valve when the gas turbine engine is operating at at least one of an idle condition, a deceleration and an acceleration.

4. The gas turbine engine as set forth in claim 3, wherein said heat exchanger cools an oil associated with the gas turbine engine.

5. The gas turbine engine as set forth in claim 4, wherein said turbine section driving a gearbox and said oil is associated with said gearbox.

6. The gas turbine engine as set forth in claim 5, wherein said dump outlet including a manifold and at least one orifice, with said manifold being mounted within said heat exchanger duct.

7. The gas turbine engine as set forth in claim 2, wherein said heat exchanger cools an oil associated with the gas turbine engine.

8. The gas turbine engine as set forth in claim 7, wherein said turbine section driving a gearbox and said oil is associated with said gearbox.

9. The gas turbine engine as set forth in claim 8, wherein said dump outlet including a manifold and at least one orifice, with said manifold being mounted within said heat exchanger duct.

10. The gas turbine engine as set forth in claim 1, wherein said control is programmed to open said bleed air valve when the gas turbine engine is operating at at least one of an idle condition, a deceleration and an acceleration.

11. The gas turbine engine as set forth in claim 10, wherein said heat exchanger cools an oil, and said turbine section driving a gearbox and said oil is associated with said gearbox.

12. The gas turbine engine as set forth in claim 11, wherein said dump outlet including a manifold and at least one orifice, with said manifold being mounted within said heat exchanger duct.

13. The gas turbine engine as set forth in claim 1, wherein said heat exchanger cools an oil associated with the gas turbine engine.

14. The gas turbine engine as set forth in claim 13, wherein said turbine section driving a gearbox and said oil is associated with said gearbox.

15. The gas turbine engine as set forth in claim 14, wherein said dump outlet including a manifold and at least one orifice, with said manifold being mounted within said heat exchanger duct.

16. The gas turbine engine as set forth in claim 13, wherein said dump outlet including a manifold and at least one orifice, with said manifold being mounted within said heat exchanger duct.

17. The gas turbine engine as set forth in claim 16, wherein said dump outlet includes a plurality of orifices spaced across a flow area of an interior of said heat exchanger duct.

18. The gas turbine engine as set forth in claim 16, wherein said dump outlet includes an elongated slot spaced across a flow area of an interior of said heat exchanger duct.

19. The gas turbine engine as set forth in claim 1, wherein said dump outlet includes a plurality of orifices spaced across a flow area of an interior of said heat exchanger duct.

20. The gas turbine engine as set forth in claim 1, wherein said dump outlet includes an elongated slot spaced across a flow area of an interior of said heat exchanger duct.

* * * * *